United States Patent [19]

Watabe et al.

[11] Patent Number: 4,987,271
[45] Date of Patent: Jan. 22, 1991

[54] METHOD FOR PURIFYING A POLYOXYALKYLENE ALCOHOL

[75] Inventors: Takashi Watabe, Yokohama; Hiromitsu Takeyasu, Tokyo; Takao Doi; Nobuaki Kunii, both of Yokohama, all of Japan

[73] Assignee: Asahi Glass Company, Ltd., Tokyo, Japan

[21] Appl. No.: 480,126

[22] Filed: Feb. 14, 1990

[30] Foreign Application Priority Data

Feb. 17, 1989 [JP] Japan .................................. 64-36306
Feb. 17, 1989 [JP] Japan .................................. 64-36307

[51] Int. Cl.$^5$ ....................... C07C 37/68; C07C 37/82
[52] U.S. Cl. .................................... 568/621; 536/120; 564/475; 564/497; 568/607; 568/608; 568/609; 568/614
[58] Field of Search ............... 568/621, 607, 608, 609, 568/614; 536/120; 564/475, 447

[56] References Cited

U.S. PATENT DOCUMENTS 4,721,818  1/1988  Harper et al. .

FOREIGN PATENT DOCUMENTS 2085457  4/1982  United Kingdom .

*Primary Examiner*—Howard T. Mars
*Attorney, Agent, or Firm*—Oblon, Spivak, McClelland, Maier & Neustadt

[57] ABSTRACT

A method for purifying a polyoxyalkylene alcohol, which comprises treating with a treating agent consisting essentially of a pH buffer, a polyoxyalkylene alcohol containing a double metal cyanide complex catalyst, synthesized by ring-opening polymerization of an alkylene oxide in the presence of said catalyst, and then removing the catalyst and the treating agent from the polyoxyalkylene alcohol.

19 Claims, No Drawings

METHOD FOR PURIFYING A POLYOXYALKYLENE ALCOHOL

The present invention relates to a method for purifying a polyoxyalkylene alcohol.

Polyoxyalkylene alcohols are compounds having ether bonds in their molecular chains and hydroxyl groups as the terminal groups, which are prepared by using, as initiators, compounds having active hydrogen-containing functional groups such as hydroxyl groups, amino groups or carboxylic acid groups, to which alkylene oxides are reactive, and reacting thereto alkylene oxides for ring-opening polymerization. Polyoxyalkylene alcohols having at least two hydroxyl groups (i.e. polyoxyalkylene polyols) are referred to also as polyether polyols, and they are one of the main starting compounds in the polyurethane industry and important compounds from the industrial viewpoint. Polyoxyalkylene alcohols having at least one hydroxyl group are widely used as surfactants or oils, or as their raw materials. The polyoxyalkylene alcohols can be controlled to have an optional number of terminal hydroxyl groups by using, as the initiator, an initiator having the optional number of functional groups. The number of functional groups of the initiator may, in principle, be any optional number of at least 1 and is usually selected within a range of from 1 to 8.

As mentioned above, the typical examples of the polyoxyalkylene alcohol in the present invention are polyoxyalkylene alcohols having at least two hydroxyl groups i.e. polyoxyalkylene polyols. The present invention will be described hereinafter mainly on the basis of polyoxyalkylene polyols. However, it should be understood that the present invention does not exclude polyoxyalkylene alcohols having only one hydroxyl group i.e. polyoxyalkylene monools.

As a method for producing a polyoxyalkylene alcohol by ring-opening polymerization of an alkylene oxide, the following U.S. Pat. Nos. and EP283148 disclose a method wherein a double metal cyanide complex such as zinc cobalt cyanide-glyme is used as a catalyst U.S. Pat. Nos. 3,278,457, 3,278,458, 3,278,459, 3,427,256, 3,427,334, 3,427,335, 3,829,505, 3,941,849, 4,355,188, 4,472,560 and 4,721,818.

On the other hand, it is known that in a case where a synthesized polyoxyalkylene polyol is used as a starting material in the polyurethane industry, if the above-mentioned catalyst or metal components as its decomposition products are present in the polyoxyalkylene polyol, a substantial amount of allophanate groups will be formed during the reaction of the polyoxyalkylene polyol with the polyisocyanate, which brings about undesirable results (U.S. Pat. No. 4,355,188). Accordingly, in the method for producing a polyoxyalkylene polyol using a double metal cyanide complex as a catalyst, it is desirable to sufficiently remove the catalyst or the decomposition products of the catalyst by purification. As such as a purification method, U.S. Pat. No. 4,355,188 proposes a method wherein the catalyst in the polyoxyalkylene polyol is decomposed by a strong alkali such as an alkali metal or an alkali metal hydroxide, and then metal components are removed by an ion exchange resin. This U.S. Pat. No. indicates that if aqueous ammonia is used instead of the strong alkali for the treatment of the catalyst-containing polyoxyalkylene polyol, the effects for the removal of metal components will be poor, and no good results are obtained except under a strong alkali condition. Further, U.S. Pat. No. 4,721,818 proposes a method for removing the metal components by decomposing the catalyst with an alkali metal hydride and adding a filtering aid, followed by filtration. However, both methods have drawbacks from the viewpoint of safety and economical aspects in that they employ materials which are water-prohibitive and require a special care for handling, such as an alkali metal or an alkali metal hydride, or tetrahydrofuran is used as a solvent. Therefore, they are not necessarily satisfactory as methods for purifying polyoxyalkylene polyols.

It is an object of the present invention to use a raw material easy to handle and to provide an efficient purification method as a method for removing the catalyst or the decomposed products of the catalyst from a polyoxyalkylene alcohol, when the polyoxyalkylene alcohol is prepared by the ring-opening polymerization of an alkylene oxide using a double metal cyanide complex as a catalyst.

Basically, the present invention provides the following two purification methods.

A method for purifying a polyoxyalkylene alcohol, which comprises treating with a treating agent consisting essentially of a pH buffer, a polyoxyalkylene alcohol containing a double metal cyanide complex catalyst, synthesized by ring-opening polymerization of an alkylene oxide in the presence of said catalyst, and then removing the catalyst and the treating agent from the polyoxyalkylene alcohol.

A method for purifying a polyoxyalkylene alcohol, which comprises treating with a treating agent consisting essentially of at least one member selected from the group consisting of a pH buffer and an aqueous ammonia solution, a polyoxyalkylene alcohol containing a double metal cyanide complex catalyst, synthesized by ring-opening polymerization of an alkylene oxide in the presence of said catalyst, reacting simultaneously or subsequently a metal ion chelating agent, and then removing the catalyst and the treating agent from the polyoxyalkylene alcohol.

Now, the present invention will be described in detail with reference to the preferred embodiments.

The double metal cyanide complex in the present invention is believed to have the following general formula (1) as disclosed in the above-mentioned publications:

$$M_a[M'_x(CN)_y]_b(H_2O)_c(R)_d \qquad (1)$$

wherein M is Zn(II), Fe(II), Fe(III), Co(II), Ni(II), Al(III), Sr(II), Mn(II), Cr(III), Cu(II), Sn(II), Pb(II), Mo(IV), Mo(VI), W(IV) or W(VI); M' is Fe(II), Fe(III), CO(II), CO(III), Cr(II), Cr(III), Mn(II), Mn(III), Ni(II), V(IV) or V(V); R is an organic ligand; a, b, x and y are positive integers which vary depending upon the valences and coordination number of metals; and c and d are positive integers which vary depending upon the coordination number of metals.

In the formula (1), M is preferably Zn(II), and M' is is preferably Fe(II), Fe(III), Co(II) or Co(III). The organic ligand includes, for example, a ketone, an ether, an aldehyde, an ester, an alcohol or an amide.

The double metal cyanide complex of the formula (1) given above, is prepared by mixing aqueous solutions, or solutions in a solvent mixture of water and an organic solvent, of a metal salt $MX_a$ wherein M and a are as defined above, and X is an anion capable of forming a salt with M, and a polycyano methalate (salt) $Z_e[M'_x(CN)_y]_f$ wherein M', x and y are as defined above, Z is hydrogen, an alkali metal, an alkaline earth metal, etc, and e and f are positive integers determined by the valences and coordination number of Z and M', contacting an organic ligand R to the resulting double metal cyanide, and then removing excess solvent and organic compound R.

In the polycyano methalate (salt) $Z_e[M'_x(CN)_y]_f$, Z may be hydrogen or a metal of various types including alkali metals. However, it is preferably a lithium salt, a sodium salt, a potassium salt, a magnesium salt or a calcium salt. Particularly preferred is a usual alkali metal salt i.e. a sodium salt or a potassium salt.

The polyoxyalkylene alcohol is prepared usually by reacting a mixture of a monoepoxide with an initiator in the presence of a catalyst. Otherwise, it is also possible to conduct the reaction by gradually adding the monoepoxide to the reaction system. The reaction usually proceeds at room temperature. However, if necessary, the reaction system may be heated or cooled. The amount of the catalyst is not particularly limited, but is usually from 1 to 5,000 ppm, preferably from 30 to 1,000 ppm, relative to the initiator used. The catalyst may be introduced into the reaction system all at once at the beginning or may be gradually introduced in a divided sequential fashion.

By means of this double metal cyanide catalyst, it is possible to synthesize a polyoxyalkylene alcohol having a low content of an unsaturated monool, or having a low content of an unsaturated monool and having an extremely high molecular weight.

The pH buffer to be used as the treating agent in the present invention is the one having an ability to maintain the pH within a certain predetermined range. As such a pH buffer, a weakly basic salt or a weakly acidic salt is employed, and an acid or a base may be used in combination therewith. With a view to facilitating the removal of the treating agent after the treatment, the base or the acid is preferably volatile. Accordingly, ammonia (ammonium) is preferred as a base. Likewise, a volatile organic acid such as acetic acid or formic acid is preferred as the acid. Preferably, an ammonium salt, particularly an ammonium salt of acetic acid or formic acid, is used. The pH buffer is used usually in the form of an aqueous solution. The concentration is not particularly limited, but is usually not higher than the solubility of the pH buffer, particularly not higher than 40% by weight. The lower limit is usually 2% by weight, preferably 5% by weight.

In some cases, ammonia may be used instead of the pH buffer, as will be described hereinafter. It is particularly preferred to use aqueous ammonia having a pH of at least 9. Most preferably, the above-mentioned pH buffer and ammonia are used in combination, and usually an ammonia containing aqueous pH buffer solution having the pH buffer dissolved in aqueous ammonia, is used. The pH of that aqueous solution is preferably at least 9.

As mentioned above, an ammonium salt is preferred as the pH buffer. Specifically, the ammonium salt includes, for example, ammonium chloride, ammonium sulfate, ammonium phosphate, ammonium acetate, ammonium formate and ammonium oxalate.

The treatment with the above treating agent can be conducted adequately simply by adding the treating agent to the catalyst-containing polyoxyalkylene alcohol and maintaining the mixture for a certain period of time. Preferably, the mixture is maintained under stirring for at least a certain period of time. Heating is not essential, but the mixture may be heated to facilitate the treatment. Usually, the mixture is stirred at a temperature where evaporation of ammonia is little (about room temperature), or stirred under heating in a closed container such as an autoclave. The retention time is not particularly limited and is usually from 10 minutes to a few hours or more. The treating time varies depending upon the amount to be treated, but is usually at least 30 minutes. The amount of the treating agent varies depending upon the content of the catalyst. For example, when an ammonia-containing aqueous pH buffer solution having a pH of at least 9, is used, it is preferred to add from 0.001 to 10% by weight of the ammonia-containing aqueous pH buffer solution to the catalyst-containing polyoxyalkylene alcohol. Particularly preferred is an amount from 0.01 to 5% by weight.

In the present invention, at the same as or subsequent to the treatment with the above-mentioned treating agent, a further treatment with a metal ion chelating agent may be conducted. When the treatment with a metal ion chelating agent is used in combination, it is possible to employ a treatment with only ammonia instead of the above-mentioned treatment with the pH buffer. Of course, it is possible to employ the treatment with the pH buffer or the treatment with the pH buffer and ammonia. The metal ion chelating agent is added preferably in an amount sufficient to chelate metals in the catalyst-containing polyoxyalkylene alcohol. Usually, it is used in an amount of from 0.0001 to 1% by weight, preferably from 0.001 to 0.1% by weight, relative to the catalyst-containing polyoxyalkylene alcohol.

The above treatment with the metal ion chelating agent can be conducted in the same manner as the treatment with the treating agent consisting essentially of a pH buffer. Namely, after completion of the treatment with the treating agent consisting of a pH buffer, a metal ion chelating agent is simply added to the polyoxyalkylene alcohol containing the treating agent, and the mixture is maintained for a certain period of time. Preferably, the mixture is maintained under stirring for at least a certain period of time. Heating is not essential, but the mixture may be heated. The retention time is not particularly limited, but is usually from 10 minutes to a few hours or more. The treating time varies depending upon the amount to be treated, but it is usually at least 30 minutes. When the treatment with the metal ion chelating agent is conducted at the same time as the treatment with the treating agent composed of a pH buffer, the same conditions as employed for the above-mentioned treatment with the treating agent composed of a pH buffer, may be employed.

As the metal ion chelating agent, a compound capable of coordinating to a metal ion to form a so-called chelate compound, may be employed. As such a metal ion chelating agent, an aminocarboxylic acid multidentate ligand having a plurality of amino groups and carboxyl groups, or its alkali metal salt or ammonium salt, is preferred. The amino carboxylic acid multidentate ligand includes, for example, ethylenediamine tetraacetic acid, ethylenediamine diacetic acid, diethylenetriamine pentaacetic acid, triethylenetetramine hexaacetic acid, N-(2-hydroxylethyl)ethylenediamine triacetic acid and nitrilotriacetic acid. Ethylenediamine tetraacetic acid, nitrilotriacetic acid and alkali metal salts or ammonium salts thereof are particularly preferred from the viewpoint of the effects and economical reasons.

Several methods are conceivable for removing impurities such as the double metal cyanide complex catalyst components decomposed by the above treatment or metal components of the ionized catalyst. However, an adsorption removal method by means of an adsorbent is most convenient in view of the simplicity of operation i.e. comprising an addition of the adsorbent and filtration, only. Further, the adsorption removal may be combined with the removal of volatile components which can be conducted by reduced pressure treatment, by heating and reduced pressure treatment or by inert gas-blowing treatment. This volatile component removal treatment may be conducted at the same time as the adsorption removal treatment, or before or after the adsorption removal treatment. The volatile components include ammonia and water.

As the adsorbent, a solid adsorbent commonly known including a metal oxide and a metal hydroxide, can be used. Solid adsorbents may be used alone or in combination as a mixture of two or more. The metal oxide includes solid adsorbents, such as magnesium oxide (MgO), aluminum oxide ($Al_2O_3$) and silicon oxide ($SiO_2$), and complexes thereof, such as magnesia aluminate ($MgO.xAl_2O_3$), mangesia silicate ($MgO.xSiO_2$), alumino silicate ($Al_2O_3.xSiO_2$) and zeolite, as well as hydrates thereof. The metal hydroxide includes solid adsorbents such as aluminum hydroxide [$Al(OH)_3$] and a hydrotalcite compound [$Mg_aAl_b(OH)_c(CO_3).mH_2O$] (a, b, c and m have various values). Here, a, b, c and x are different from those described with respect to the above metal cyanide complex.

The solid adsorbent is added to the polyoxyalkylene alcohol after the treatment with the above-mentioned treating agent and usually left to stand for a while under stirring to let adsorption of the components to be adsorbed sufficiently proceed, and then it is removed by filtration. To improve the filtration properties, a filtration aid commonly known may be optionally added at the time of the filtration operation.

It is also possible to employ an ion exchange resin as the solid adsorbent. In such a case, the polyoxyalkylene alcohol after the treatment with the above-mentioned treating agent is, if necessary after an addition of deionized water or a solvent, passed through a column packed with a cation exchange resin or an anion exchange resin, and then the removal of water and the solvent may be conducted under reduced pressure, if necessary, to obtain a purified polyol.

With the polyoxyalkylene alcohol purified by the present invention, the amount of remaining metals derived from the catalyst is reduced to a level which can not be detected by an ICP emission spectral analysis. It is believed that in the present invention, the double metal cyanide complex catalyst contained in the polyoxyalkylene alcohol is decomposed by the action of the pH buffer, particularly by the ammonia-containing pH buffer, to form ionic metal complex compounds, which are then removed by chelating with the metal chelating agent, by adsorption of the catalyst metal components or the chelated metal components by the solid adsorbent, or by the ion exchange of such metal components by an ion exchange resin.

As the polyoxyalkylene alcohol in the present invention, a polyoxyalkylene polyol is preferred. The polyoxyalkylene polyol is the one obtained by reacting a monoepoxide such as an alkylene oxide to an initiator having at least two hydroxyl groups for sequential ring-opening addition reaction. As such an initiator, it is particularly preferred to employ a polyhydroxy compound having from 2 to 8 hydroxyl groups. Such a polyhydroxy compound includes, for example, bivalent alcohols such as ethylene glycol and propylene glycol, trivalent alcohols such as glycerol, trimethylolpropane and hexanetriol, and tetravalent or higher valent alcohols such as pentaerythritol, diglycerol, dextrose, sorbitol and sucrose, as well as polyoxyalkylene alcohols having lower molecular weights than the desired products obtained by reacting such alcohols with monoepoxides such as alkylene oxides. Further, it includes compounds having phenolic hydroxyl groups or methylol groups such as bisphenol A, resol and novolak, compounds having hydroxyl groups and other active hydrogen, such as ethanolamine and diethanolamine, as well as polyoxyalkylene alcohols having lower molecular weights than the desired products obtained by reacting thereto monoepoxides such as alkylene oxides. Further, it includes polyoxyalkylene alcohols having lower molecular weights than the desired products obtained by reacting monoepoxides such as alkylene oxides to monoamines or polyamines having at least two hydrogen atoms bonded to nitrogen atoms. Furthermore, phosphoric acid or its derivatives as well as other polyhydroxy compounds, may be used. These polyhydroxyl compounds may be used in combination as a mixture of two or more.

The present invention is applicable also to a polyoxyalkylene monool obtained by reacting a monoepoxide to a monovalent initiator for ring opening reaction. Such a monovalent initiator includes, for example, methanol, ethanol, butanol, hexanol, other monools, phenol and phenol derivatives such as alkyl-substituted phenols, as well as polyoxyalkylene alcohols having lower molecular weights than the desired products obtained by reacting thereto monoepoxides such as alkylene oxides. It further includes polyoxyalkylene alcohols having lower molecular weights than the desired products obtained by reacting monoepoxides such as alkylene oxides to monoamines or polyamines having one hydrogen atom bonded to a nitrogen atom.

Such a monoepoxide is a monoepoxide having at least two carbon atoms. Particularly preferred is an alkylene oxide having at least two carbon atoms. More preferably, an alkylene oxide having from 3 to 4 carbon atoms such as propylene oxide, 1,2-butylene oxide, 2,3-butylene oxide or epichlorohydrin, may be mentioned. Most preferred is propylene oxide. Alkylene oxides having from 3 to 4 carbon atoms may be used alone or in combination as a mixture of two or more, or they may be used in combination with other monoepoxides such as ethylene oxide, styrene oxide, glycidyl ether and glycidyl ester. When two or more alkylene oxides are used, or when an alkylene oxide and other monoepoxide are used, they may be mixed for addition or sequential addition to form a random polymer chain or a block polymer chain.

The molecular weigh of the polyoxyalkylene alcohol in the present invention, is not particularly limited. However, a product which is liquid at room temperature, is preferred from the viewpoint of its applications. The amount of the monoepoxide reacted to one mol of the initiator, is preferably at least about 10 mols, more preferably at least about 50 mols. More preferred is a polyoxyalkylene alcohol obtained by reacting at least about 10 molecules, more preferably at least about 30 molecules, on an average, per hydroxyl group of the initiator. If represented by the hydroxyl value, the hydroxyl value is preferably at most 200, more preferably at most 100. For example, as a starting material for a polyurethane, a liquid polyoxyalkylene polyol having a hydroxyl value of from about 5 to 200, more preferably from 5 to 60, is preferred. For other purposes, such as as the starting material of an oil such as machine oil, a polyoxyalkylene polyol (or monool) within the above-mentioned range is preferred.

The polyoxyalkylene polyol obtained by the present invention is most useful as a polyol for a polyurethane starting material to be used alone or in combination with other polyols. Further, the polyoxyalkylene polyol (or monool) obtained by the present invention can be used as a starting material for synthetic resins other than polyurethane or as an additive. Further, it is useful as a lubricating oil, an insulating oil, a machine oil or oils of other purposes, or as a starting material thereof. Furthermore, the polyoxyalkylene alcohol obtained by the present invention can be converted to other compounds such as an alkyl ether compound or an acyl compound and thus can be used for various purposes.

Now, the present invention will be described in further detail with reference to Examples. However, it should be understood that the present invention is by no means restricted to such specific Examples.

A polyetherpolyol containing a double metal cyanide complex catalyst was prepared in accordance with a known method. Using zinc hexacyanocobaltate/glyme as a catalyst and 1,2,3-tri(2-hydroxy-propoxy)propane as an initiator, propylene oxide was polymerized to obtain a polyoxypropylenetriol having a number average molecular weight of about 6,000 (hydroxyl value: 28.6). This polyol contained the zinc hexacyanocobaltate catalyst in an amount corresponding to 86 ppm of zinc and 35 ppm of cobalt as metal components. This polymer will be referred to hereinafter as a non-purified polyol. The purification method using this non-purified polyol will be described in the following Examples.

EXAMPLE 1

To 250 g of the non-purified polyol, 2.5 ml of an aqueous buffer solution A (an aqueous solution prepared by dissolving 570 g of concentrated aqueous ammonia and 70 g of ammonium chloride in 1 l of water and having pH10) was added, and the mixture was stirred at room temperature for one hour. Then, 2.5 g of magnesia silicate ($2MgO.6SiO_2$) and 2.5 g diatomaceous earth were added thereto. Removal of ammonia and water was conducted while raising the temperature. Finally, water removal operation was conducted for 2 hours at 110° C. under a reduced pressure of 1 mmHg. Then, pressure filtration (under a pressure condition of 3 kg/cm² by $N_2$, the same applies hereinafter) was conducted using a filter paper (No. 5C manufactured by Toyo Roshi K.K., the same applies hereinafter) to obtain a purified polyol.

EXAMPLE 2

To 250 g of the non-purified polyol, 0.5 ml of an aqueous buffer solution A was added, and the mixture was stirred in an autoclave at 80° C. for 3 hours. Then, 1 g of zeolite (synthetic zeolite F-9, manufactured by Wako Junyaku K.K.) was added. Then, removal of ammonia and water was conducted for 3 hours at 110° C. under a reduced pressure of 1 mmHg, and then, pressure filtration was conducted using a filter paper to obtain a purified polyol.

EXAMPLE 3

To 250 g of the non-purified polyol, 0.5 ml of an aqueous buffer solution B (an aqueous solution prepared by dissolving 570 g of concentrated aqueous ammonia and 173 g of ammonium sulfate in 1 l of water and having pH10) was added, and the mixture was stirred at 80° C. for 3 hours in an autoclave. Then, 1 g of aluminum hydroxide magnesium carbonate [$Mg_6Al_2(OH)_{16}CO_3$] was added thereto. Removal of ammonia and water was conducted at 110° C. under a reduced pressure of 1 mmHg for 3 hours, and then pressure filtration was conducted using a filter paper to obtain a purified polyol.

EXAMPLE 4

To 250 g of the non-purified polyol, 0.5 ml of an aqueous buffer solution C (an aqueous solution prepared by dissolving 570 g of concentrated aqueous ammonia and 101 g of ammonium acetate in 1 l of water and having pH10) was added, and the mixture was stirred at 80° C. for 3 hours in an autoclave. Then, 2.5 g of magnesia silicate and 2.5 g of diatomaceous earth were added. Removal of ammonia and water was conducted while raising the temperature, and finally water removal operation was conducted at 110° C. under a reduced pressure of 1 mmHg for 2 hours. Then, pressure filtration was conducted using a filter paper to obtain a purified polyol.

EXAMPLE 5

Purification of the non-purified polyol was conducted under the same conditions as in Example 4 except that instead of the aqueous buffer solution C, an aqueous buffer solution D (an aqueous solution prepared by dissolving 570 g of concentrated aqueous ammonia and 82.5 g of ammonium formate in 1 l of water and having pH10) was used.

EXAMPLE 6

To 250 g of the non-purified polyol, 0.5 ml of an aqueous buffer solution A was added, and the mixture was stirred at 80° C. for 3 hours in an autoclave and then cooled to room temperature. To the mixture, 100 ml of a water-methanol (1:1) solution was added, and 10 g of each of the anion exchange resin (DIAION ™ SK110, manufactured by Mitsubishi Kasei Corporation) and an anion exchange resin (DIAION ™ PA316, manufactured by Mitsubishi Kasei Corporation) was added thereto. The mixture was stirred at 25° C. for one hour and then filtered. From the polyol mixture thereby obtained, water and methanol were removed under reduced pressure, and finally water removal operation was conducted at 110° C. under a reduced pressure of 1 mmHg for 2 hours. Then, pressure filtration was conducted using a filter paper to obtain a purified polyol.

COMPARATIVE EXAMPLE 1

To 250 g of the non-purified polyol, 0.25 g of concentrated aqueous ammonia was added, and the mixture was stirred at room temperature for 1 hour. Then, 2.5 g of magnesia silicate was added thereto. The mixture was stirred at 25° C. for one hour and then water removal operation was conducted at 110° C. under a reduced pressure of 1 mmHg for 2 hours. Then, pressure filtration was conducted using a filter paper to obtain a polyol.

COMPARATIVE EXAMPLE 2

To 250 g of the non-purified polyol, 1.25 g of concentrated aqueous ammonia was added, and the mixture was stirred at room temperature for 1 hour, and 100 ml of a water-methanol (1:1) solution was added thereto Then, 10 g of each of the cation exchange resin and the anion exchange resin as used in Example 6, was added thereto. The mixture was stirred at 25° C. for one hour and then filtered. From the polyol mixture thus obtained, water and methanol were removed under reduced pressure, and finally water removal operation was conducted at 110° C. under a reduced pressure of 1 mmHg for 2 hours. Then, pressure filtration was conducted using a filter paper to obtain a purified polyol.

COMPARATIVE EXAMPLE 3

To 250 g of the non-purified polyol, 2.5 g of magnesia silicate was added, and the mixture was stirred at room temperature for one hour. Then, water removal operation was conducted at 110° C. under a reduced pressure of 1 mmHg for 2 hours. Then, pressure filtration was conducted using a filter paper to obtain a polyol.

The results of the analysis of the purified polyols obtained in the above Examples 1 to 6 and Comparative Examples 1 to 3 are shown in Table 1.

TABLE 1

| | Analytical results | | | |
|---|---|---|---|---|
| | Zn (ppm)** | Co (ppm)** | Water (%) | CPR*** |
| Example 1 | n.d.* | n.d. | 0.025 | 2.0 |
| Example 2 | 0.5 | n.d. | 0.018 | 1.8 |
| Example 3 | n.d. | n.d. | 0.018 | 1.5 |
| Example 4 | 0.5 | n.d. | 0.028 | 2.5 |
| Example 5 | 0.5 | n.d. | 0.022 | 3.0 |
| Example 6 | n.d. | n.d. | 0.022 | 1.0 |
| Comparative Example 1 | 10.0 | 2.5 | 0.025 | 3.5 |
| Comparative Example 2 | 7.0 | 1.5 | 0.025 | 1.8 |
| Comparative Example | 42 | 19 | 0.020 | 1.0 |

*Not ditectable
**As analyzed by ICP emission spectral analysis
***Total basicity in accordance with JIS K1557

EXAMPLE 7

To 250 g of the non-purified polyol, 1.25 g of concentrated aqueous ammonia was added, and the mixture was stirred at room temperature for one hour. Then, 10 ml of an aqueous solution containing 90 mg of disodium ethylenediamine tetraacetate was added thereto, and the mixture was stirred at room temperature for one hour. To the mixture, 5.0 g of alumina (200 mesh) manufactured by Merck Co. was added. Removal of ammonia and water was conducted under reduced pressure while raising the temperature, and finally water removal operation was conducted at 110° C. under a reduced pressure of 1 mmHg for 2 hours. Then, pressure filtration was conducted using a filter paper to obtain a purified polyol.

EXAMPLE 8

To 250 g of the non-purified polyol, 2.5 ml of an aqueous buffer solution A was added, and the mixture was stirred at room temperature for one hour. Then, 10 ml of an aqueous solution containing 90 mg of disodium ethylenediamine tetraacetate was added thereto, and the mixture was stirred at room temperature for one hour. To the mixture, 2.5 g of aluminum hydroxide magnesium carbonate was added. Removal of ammonia and water was conducted under reduced pressure while raising the temperature, and finally water removal operation was conducted at 110° C. under a reduced pressure of 1 mmHg for 2 hours. Then, pressure filtration was conducted using a filter paper to obtain a purified polyol.

EXAMPLE 9

To 250 g of the non-purified polyol, 2.5 ml of an aqueous buffer solution A was added, and the mixture was stirred at room temperature for one hour. Then, 10 ml of an aqueous solution containing 90 mg of disodium ethylenediamine tetraacetate was added thereto, and the mixture was stirred at room temperature for one hour. To the mixture, 2.5 g of magnesia silicate was added. Removal of ammonia and water was conducted under reduced pressure while raising the temperature, and finally water removal operation was conducted at 110° C. under a reduced pressure of 1 mmHg for 2 hours. Then, pressure filtration was conducted using a filter paper to obtain a purified polyol.

EXAMPLE 10

To 250 g of the non-purified polyol, an aqueous solution having 1.25 g of concentrated aqueous ammonia and 90 mg of ethylenediamine tetraacetate dissolved, was added, and the mixture was stirred at room temperature for 2 hours. To the mixture, 2.5 g of magnesia aluminate (2.5 MgO.Al$_2$O$_3$) was added. Removal of ammonia and water was conducted under reduced pressure while raising the temperature, and finally water removal operation was conducted at 110° C. under a reduced pressure of 1 mmHg for 2 hours. Then, pressure filtration was conducted using a filter paper to obtain a purified polyol.

EXAMPLE 11

To 250 g of the non-purified polyol, 2.5 ml of the aqueous buffer solution A was added, and the mixture was stirred at room temperature for one hour. Then, 10 ml of an aqueous solution containing 80 mg of disodium nitrilotriacetate was added thereto, and the mixture was stirred at room temperature for one hour. To the mixture, 5 g of zeolite was added. Removal of ammonia and water was conducted while raising the temperature, and finally water removal operation was conducted at 110° C. under a reduced pressure of 1 mmHg for 2 hours. Then, pressure filtration was conducted using a filter paper to obtain a purified polyol.

EXAMPLE 12

To 250 g of the non-purified polyol, 2.5 ml of the aqueous buffer solution C was added, and the mixture was stirred at room temperature or one hour. Then, 10 ml of an aqueous solution containing 90 mg of disodium ethylenediamine tetraacetate was added thereto, and the mixture was stirred at room temperature for one hour. To the mixture, 2.5 g of aluminum hydroxide magnesium carbonate was added. Removal of ammonia and water was conducted while raising the temperature, and finally water removal operation was conducted at 110° C. under a reduced pressure of 1 mmHg for 2 hours. Then, pressure filtration was conducted using a filter paper to obtain a purified polyol.

EXAMPLE 13

Purification of the non-purified polyol was conducted under the same conditions as in Example 12 except that instead of the aqueous buffer solution C, the aqueous buffer solution D was used.

EXAMPLE 14

To 250 g of the non-purified polyol, 2.5 ml of the aqueous buffer solution A was added, and the mixture was stirred at room temperature for one hour. Then, 10 ml of an aqueous solution containing 90 mg of disodium ethylenediamine tetraacetate was added thereto, and the mixture was stirred at room temperature for one hour. A chromatography column was packed with 10 g of each of the cation exchange resin and the anion exchange resin as used in Example 6, and from above the column, the polyol mixture was passed therethrough. The polyol obtained from the lower end of the column was subjected to water removal treatment at 110° C. under a reduced pressure of 1 mmHg to obtain a purified polyol. The results of the analysis of the polyols purified in Examples 7 to 14 are shown in Table 2.

TABLE 2

| | Analytical results | | | |
|---|---|---|---|---|
| | Zn (ppm)** | Co (ppm)** | Water (%) | CPR*** |
| Example 7 | 0.5 | n.d.* | 0.018 | 5.3 |
| Example 8 | n.d. | n.d. | 0.025 | 1.5 |
| Example 9 | n.d. | n.d. | 0.020 | 1.8 |
| Example 10 | 1.0 | n.d. | 0.030 | 3.5 |
| Example 11 | 0.5 | n.d. | 0.028 | 3.8 |
| Example 12 | 0.7 | n.d. | 0.030 | 4.2 |
| Example 13 | 2.0 | n.d. | 0.026 | 5.0 |
| Example 14 | n.d. | n.d. | 0.030 | 2.5 |

*Not ditectable
**As analyzed by ICP emission spectral analysis
***Total basicity in accordance with JIS K1557

The present invention is a method whereby the metal components of a double metal cyanide complex catalyst can efficiently and adequately be removed from a polyoxyalkylene alcohol, whereby various difficulties attributable to the metal components in the use of the polyoxyalkylene glycol can be eliminated. Thus, according to the present invention, it is possible to obtain a polyoxyalkylene polyol particularly useful as a polyurethane raw material where the metal components in the polyoxyalkylene polyol are problematic.

What is claimed is:

1. A method for purifying a polyoxyalkylene alcohol, which comprises treating with a treating agent consisting essentially of a pH buffer, a polyoxyalkylene alcohol containing a double metal cyanide complex catalyst, synthesized by ring-opening polymerization of an alkylene oxide in the presence of said catalyst, and then removing the catalyst and the treating agent from the polyoxyalkylene alcohol.

2. The method according to claim 1, wherein ammonia is used in combination with the pH buffer.

3. The method according to claim 1, wherein the pH buffer is an ammonium salt.

4. The method according to claim 1, wherein the treating agent is an aqueous solution containing an ammonium salt and ammonia.

5. The method according to claim 1, wherein the treating agent is an aqueous solution containing ammonia and at least one pH buffer selected from the group consisting of ammonium chloride, ammonium sulfate, ammonium acetate and ammonium formate.

6. The method according to claim 1, wherein the removal of the catalyst and the treating agent is conducted by an adsorption removal method by means of a solid adsorbent.

7. The method according to claim 6, wherein the solid adsorbent contains a structure of an oxide or hydroxide of at least one metal selected from the group consisting of magnesium, aluminum and silicon.

8. The method according to claim 6, wherein the solid adsorbent is an ion exchange resin.

9. The method according to claim 6, wherein removal of volatile components under reduced pressure is conducted in combination with the adsorption removal method.

10. A method for purifying a polyoxyalkylene alcohol, which comprises treating with a treating agent consisting essentially of at least one member selected from the group consisting of a pH buffer and an aqueous ammonia solution, a polyoxyalkylene alcohol containing a double metal cyanide complex catalyst, synthesized by ring-opening polymerization of an alkylene oxide in the presence of said catalyst, reacting simultaneously or subsequently a metal ion chelating agent, and then removing the catalyst and the treating agent from the polyoxyalkylene alcohol.

11. The method according to claim 10, wherein the pH buffer is an ammonium salt.

12. The method according to claim 10, wherein the treating agent is an aqueous solution containing an ammonium salt and ammonia.

13. The method according to claim 10, wherein the treating agent is an aqueous solution containing ammonia and at least one pH buffer selected from the group consisting of ammonium chloride, ammonium sulfate, ammonium acetate and ammonium formate.

14. The method according to claim 10, wherein the metal ion chelating agent is at least one member selected from the group consisting of an amino carboxylic acid compound and a salt of an amino carboxylic acid compound.

15. The method according to claim 14, wherein the amino carboxylic acid compound is at least one member selected from the group consisting of ethylenediamine tetraacetic acid and nitrilotriacetic acid.

16. The method according to claim 10, wherein the removal of the catalyst and the treating agent is conducted by an adsorption removal method by means of a solid adsorbent.

17. The method according to claim 16, wherein the solid adsorbent contains a structure of an oxide or a hydroxide of at least one metal selected from the group consisting of magnesium, aluminum and silicon.

18. The method according to claim 16, wherein the solid adsorbent is an ion exchange resin.

19. The process according to claim 16, wherein removal of volatile components under reduced pressure is conducted in combination with the adsorption removal method.

* * * * *